United States Patent [19]

Johnson

[11] 4,269,168

[45] May 26, 1981

[54] FOCUSING REFLECTOR SOLAR ENERGY COLLECTOR APPARATUS AND METHOD

[76] Inventor: Steven A. Johnson, 136 N. 1st West, Preston, Id. 83263

[21] Appl. No.: 970,761

[22] Filed: Dec. 18, 1978

[51] Int. Cl.³ .............................................. F24J 3/02
[52] U.S. Cl. .................................. 126/424; 126/438; 126/440; 126/452
[58] Field of Search ............... 126/424, 438, 440, 439, 126/441, 452; 350/211

[56] References Cited

U.S. PATENT DOCUMENTS

| Re. 30,027 | 6/1979 | Hockman | 126/439 X |
|---|---|---|---|
| 1,345,758 | 7/1920 | Folsom | 126/424 |
| 3,052,229 | 9/1962 | Wenger | 126/424 |
| 3,915,147 | 10/1975 | Rineer | 126/440 X |
| 3,998,206 | 12/1976 | Jahn | 126/425 X |
| 4,011,857 | 3/1977 | Rice | 126/440 |
| 4,011,858 | 3/1977 | Hurkett | 126/424 |
| 4,027,653 | 6/1977 | Meckler | 126/433 |
| 4,068,474 | 1/1978 | Dimitroff | 126/439 X |
| 4,069,812 | 1/1978 | O'Neill | 126/440 X |
| 4,077,392 | 3/1978 | Garner | 126/424 |
| 4,098,264 | 7/1978 | Brokan | 126/425 |
| 4,106,480 | 8/1978 | Lyon et al. | 126/438 X |
| 4,106,485 | 8/1978 | Polley | 126/425 |
| 4,108,154 | 8/1978 | Nelson | 126/425 |
| 4,108,540 | 8/1978 | Anderson et al. | 350/211 |
| 4,109,638 | 8/1978 | Matlock et al. | 126/425 |
| 4,116,221 | 9/1978 | Zaugg et al. | 126/424 |
| 4,129,119 | 12/1978 | Yoke | 126/424 |
| 4,139,286 | 2/1979 | Hein et al. | 126/440 X |
| 4,149,523 | 4/1979 | Boy-Marcotte et al. | 126/438 X |

FOREIGN PATENT DOCUMENTS 639277  6/1928  France ................................. 350/211

*Primary Examiner*—Allan N. Shoap
*Attorney, Agent, or Firm*—J. Winslow Young; H. Ross Workman; Rick D. Nydegger

[57] ABSTRACT

A solar energy collector apparatus and method, the apparatus including an open-top shell-like structure with a reflective optical system in the shell structure for directing solar energy toward a solar energy absorber apparatus inside the shell structure. The shell structure is mounted upon a hollow axle for rotation about its longitudinal axis and may be mounted for vertical movement to follow north-south changes in the apparent seasonal position of the sun. The solar energy absorber apparatus is nonrotatably mounted inside the shell structure in fluid communication with heat transfer conduits that pass through the hollow axle thereby avoiding rotatable couplings in the conduits. Photovoltaic apparatus for converting at least a portion of the solar spectrum to electrical energy may also be included in the shell structure. This combination of features provides higher solar efficiencies and higher temperatures in the heat transfer fluid. The method includes tracking the sun with the solar energy collector apparatus thereby maximizing the amount of solar energy collected while eliminating coupling failures in the heat transfer conduits.

13 Claims, 4 Drawing Figures

FOCUSING REFLECTOR SOLAR ENERGY COLLECTOR APPARATUS AND METHOD

BACKGROUND

1. Field of the Invention

This invention relates to solar energy collector apparatus and, more particularly, to a solar energy collector apparatus and method whereby focusing and reflecting apparatus for the solar collector is rotatably movable about a generally stationary solar energy absorber apparatus to eliminate expensive rotatable couplings or twisting and bending in the fluid heat transfer conduits.

This application contains patentably distinct subject matter from copending applications, Ser. No. 970,673 and Ser. No. 970,762 filed on even date herewith.

2. The Prior Art

Currently, the only inexhaustable source of energy available to mankind is solar energy. Solar energy or solar flux is customarily measured in langleys per minute, one langley being equivalent to one calorie of radiation energy per square centimeter. The intensity of the solar flux varies with geographical location, time of day, season, cloud cover, atmospheric dust, and the like, and this intensity varies between about zero and 1.5 calories per square centimeter per minute. Therefore, assuming a solar flux of one langley per minute, one square meter receives 10,000 calories per minute while a house roof, having 100 square meters, receives about 1,000,000 calories per minute. With an average of one langley per minute for 500 minutes per day (which is slightly more than 8 hours), the 100 square meter roof receives, in bright sunshine, about 500,000 kilocalories per day. This energy is the equivalent in thermal energy to burning about 14 gallons of gasoline. Therefore, solar energy represents a valuable, inexhaustable energy resource.

When an object such as a solar collector is exposed to solar radiation, its temperature rises until its heat losses become equal to its heat gains. The losses depend on the emission of radiation by the heated material, movement of the surrounding colder air, and thermal conductivity of the materials in contact with it. The gains depend upon the intensity of solar radiation and the absorptivity of solar radiation by its absorption surface. Customarily, solar energy is collected by two general techniques to produce higher temperatures: (1) by covering a receiving surface with a sunlight-transparent sheet of glass or plastic (flat plate collector), and (2) by focusing the solar radiation from a large area onto a receiver of small area (focusing collectors).

Flat plate collectors are usually stationary but should be repositioned every few days to follow the seasonal variations in the solar track. Flat plate collectors have the advantage of being generally cheaper to fabricate and also have the advantage in absorbing heat from diffuse solar radiation as well as the direct radiation by being able to operate on cloudy but bright days.

Focusing collectors can produce much higher temperatures although they can use direct radiation only and require turning throughout the day to follow the sun. Although focusing collectors are useful in obtaining higher temperatures from solar energy, (1) they usually cost more, (2) they need to be moved continuously to track the sun, and (3) they can use only direct solar radiation that is unscattered by clouds or haze. One common form of focusing collector is a parabolic mirror which has been used to obtain temperatures up to about 3500° C. depending upon the optical perfection of the parabolic surface. Unfortunately, parabolic collectors are relatively expensive, require sophisticated mountings and the absorption surface is usually interposed between the sun and the parabolic reflector at a position adjacent the focal point of the parabolic curvature.

Another device for useful focusing solar energy in a focusing collector is the Fresnel lens. The Fresnel lens consists of nested grooves cut or otherwise formed in one face of a transparent material such as plastic. The sides of each successive groove is set in such a way that the light passing through each groove is refracted at a slightly different angle so as to converge on a common focal point or line. Such lenses have been pressed from rigid sheets of plastic material and are, therefore, relatively inexpensive while being effective to give a relatively sharp focus. A more detailed discussion on the use of a Fresnel lens in a solar concentrator can be found in "Large-Scale Fresnel Lens Solar Concentrator" Marshall Space Flight Center, Alabama; *NASA Tech Briefs;* Winter (1977) p. 461.

Since focusing collectors require tracking mechanism for tracking the sun, various types of tracking devices have been developed. Tracking of the sun in its eastwest movement only is relatively simple since the sun moves at a rate of 15° of arc every hour. This calculation is determined on the basis of the earth making one complete revolution of 360° in a 24 hour period so that in one hour it moves 360° divided by 24 or 15°. However, the annual motion of the earth relative to the sun causes the sun to appear to move in declination by about 47°. This wide range from summer solstice to winter solstice is a major problem any focusing collector system must face. Thus, any fully tracking collector that is focused continuously on the position of the sun in the sky requires motion in two coordinates. While the exact coordinates in which the motion is made are not deemed important, one set of coordinates may be rendered redundant by using an equatorial mounting where one axis of rotation is supported parallel to the axis of rotation of the earth. The sun then appears to have no significant daily motion in the transverse coordinate (declination). Meanwhile, any other set of axes of motion requires two motions to track the daily motion of the sun. However, in order to accommodate seasonal variations, it is necessary to include within the equitorial mounting a mechanism for matching daily changes in the seasonal position of the sun. Thus, an equatorial mounting presents the more feasible mounting system for a tracking or focusing solar collector.

Additional information regarding solar collectors can be found in APPLIED SOLAR ENERGY, Aden B. Meinel and Marjorie P. Meinel, Addison-Wesley Publishing Company, Reading, Massachusetts (1976) Library of Congress Catalog Card No. 75-40904, and DIRECT USE OF THE SUN'S ENERGY, Farrington Daniels, Ballantine Books, New York (1977) Library of Congress Catalog Card No. 64-20913.

Utilization of collected solar energy very often occurs at a location other than the center of focus for a focusing collector. The exception to this statement are those focusing collectors which are used primarily as photovoltaic power towers, solar cookers, etc. The technique for transferring solar energy from its collection site to its utilization site generally involves some form of fluid heat transfer medium. The fluid heat transfer medium is conducted through conduits to and from the solar energy absorption site. The heat transfer medium is heated by the thermal energy produced by the absorbed solar energy and carries the thermal energy to the utilization site where the thermal energy is either utilized directly or stored for subsequent use. Unfortunately, the combination of movable solar collectors and fluid heat transfer conduits presents difficulties with regard to fabricating solar collectors which will accommodate flexure or otherwise movement of the fluid heat transfer conduits.

In view of the foregoing, it would be an advantage in the art to provide improvements in solar collector apparatus and the method for collecting solar energy. It would also be an advancement in the art to provide a solar collector apparatus for tracking the sun, the apparatus including mechanism for accommodating the movement of the solar collector while minimizing excessive flexure or twisting of the fluid heat transfer conduits. Such an invention is disclosed and claimed herein.

BRIEF SUMMARY AND OBJECTS OF THE INVENTION

The present invention relates to a novel apparatus and method for focusing and collecting solar energy. The solar energy collector apparatus is configured to be a focusing collector and includes structure to accommodate tracking the movement of the sun. Excessive flexure or twisting of the fluid heat transfer conduits is minimized by mounting the solar energy absorber apparatus in a generally stationary position inside a movable shell structure. The solar flux is focused and directed toward a solar energy absorber apparatus, in part, by curvilinear reflective surfaces inside the sheel structure. Photovoltaic apparatus may also be included for converting a portion of the solar spectrum into electrical energy.

It is, therefore, a primary object of this invention to provide improvements in solar energy collector apparatus.

Another object of this invention is to provide an improved method for collecting solar energy.

Another object of this invention is to provide a focusing solar collector apparatus which is relatively inexpensive to fabricate.

Another object of this invention is to provide a solar collector apparatus wherein the fluid heat transfer conduits are maintained in a relatively stationary position to minimize flexure of the conduits.

Another object of this invention is to provide a solar collector apparatus wherein the solar energy absorber mechanism is relatively stationary while the collector apparatus rotates thereabout.

These and other objects and features of the present invention will become more fully apparent from the following description and appended claims taken in conjunction with the accompanying drawing.

DETAILED DESCRIPTION OF THE PREFERRED EMBODIMENTS

The invention is best understood by reference to the drawings wherein like parts are designated with like numerals throughout.

Figure 1:
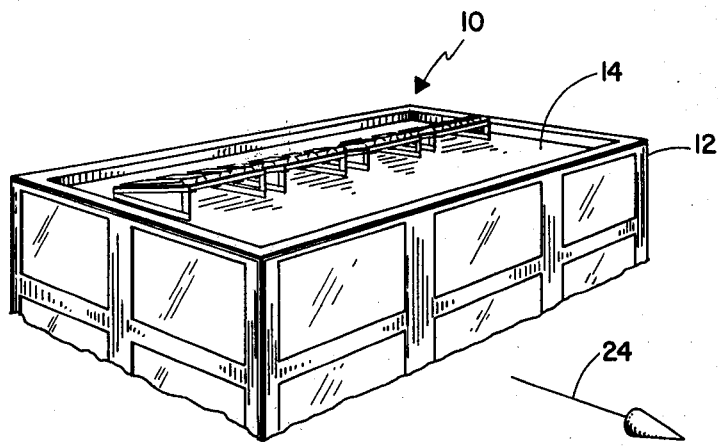
FIG. 1 is a perspective view of a solar collector apparatus of this invention in the environment of a building.

Referring now to FIG. 1, the solar collector apparatus of this invention is shown generally at 10 on the roof of a building 12. It should be noted that solar collector apparatus 10 is oriented in a north-south direction. For example, assuming arrow 24 represents geographic north then solar collector apparatus 10 is in position for collecting solar energy in a northern latitude. Conversely, if arrow 24 represents geographic south then solar collector apparatus 10 is oriented for collecting solar energy in a southern latitude.

Figure 2:
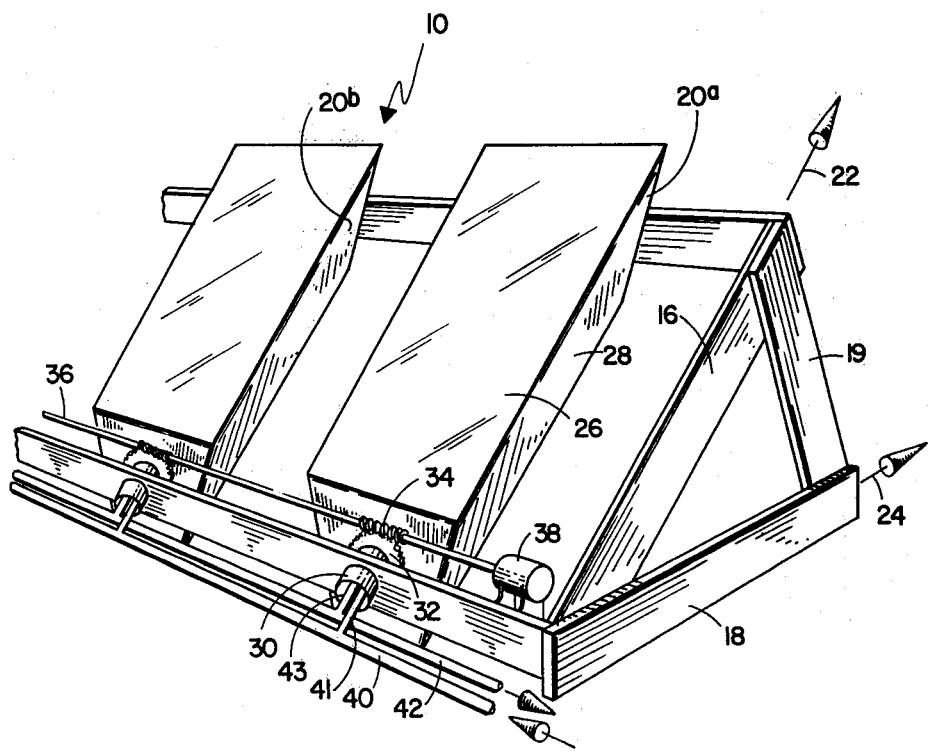
FIG. 2 is an enlarged perspective view of a fragment of the solar collector apparatus of FIG. 1.

Referring now more particularly to FIG. 2, a portion of solar collector apparatus 10 is shown and includes a plurality of solar collectors, shown herein as solar collectors 20a and 20b. Solar collectors 20a and 20b are supported in a framework 16 and framework 16 is mounted on a base 18 with a riser 19 supporting framework 16 in a direction indicated by arrow 22. Arrow 22 represents a line parallel to the axis of the earth. In this manner, framework 16 serves as the basal framework for an equatorial mount for solar collectors 20a and 20b. It shall be understood that the word shell shall include both enclosed or airtight structures (shown in FIG. 2) as well as non-enclosing or non-airtight structures such as lattice or open framework structures (not shown). It shall also be understood that such open structure shells may be enclosed either singly or in gangs behind a transparent or greenhouselike cover (not shown) to provide protection from weather.

Figure 3:
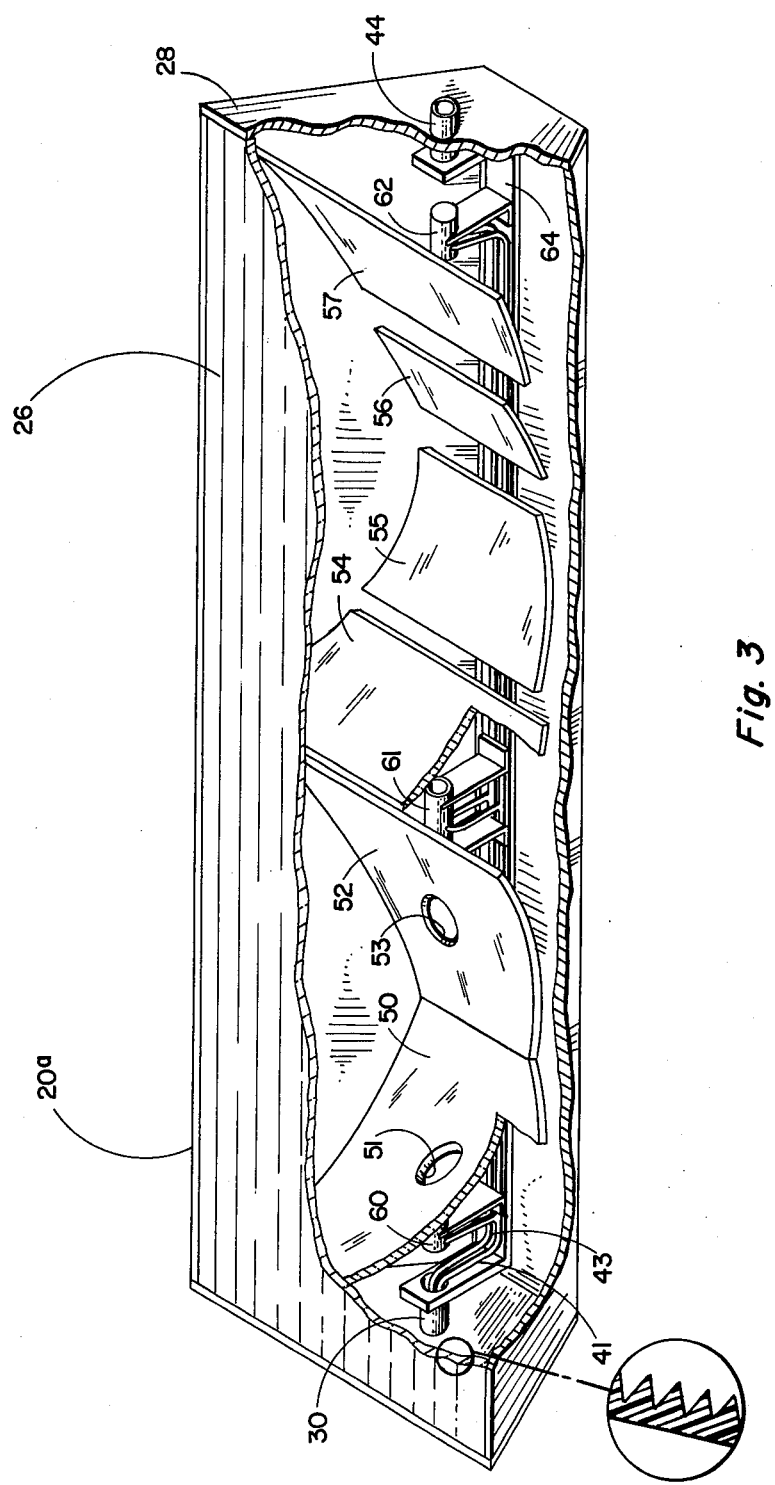
FIG. 3 is a perspective view of a first preferred embodiment of the solar collector apparatus of this invention with portions broken away to reveal hidden components.

Solar collector 20a includes a shell 28 having an open top covered with a transparent cover 26 and is supported in framework 16 by a hollow axle 30 secured thereto. Hollow axle 30 remains stationary relative to framework 16 while solar collector 20a is rotatably mounted thereto. A gear 32 engages shell 28 to thereby accommodate rotation of solar collector 20a about the longitudinal axis represented by hollow axle 30 and axle 44 (FIG. 3). A worm gear 34 engages Gear 32 is engaged by a worm gear 34 mounted on a shaft 36. A motor 38 turns shaft 36 causing worm gear 34 to advance or reverse gear 32 to thereby rotate solar collector 20a about its longitudinal axis.

Heat transfer fluid is supplied and returned through header conduits 40 and 42, respectively, and distributed into each of the solar collectors 20a and 20b by the appropriate tubing 41 and 43. Since hollow axle 30 is nonrotatably mounted to framework 16, tubing 41 and 43 pass in nonrotatable relationship through hollow axle 30.

Referring now more particularly to FIG. 3, internal structure of solar collector 20a is set forth in greater detail. Solar collector 20a consists of a shell 28 mounted in framework 16 by axles 30 and 44 with a transparent cover or Linear Fresnel lens 26 thereover. A plurality of solar energy absorber apparatus 60–62 are mounted on a bridge 64 extending between axles 30 and 44. As clearly shown, solar energy absorber apparatus 60–62 are mounted coaxially with axles 30 and 44 so that each of solar energy absorber apparatus 60–62 remains stationary at the focal point of the respective mirror, mirrors 50, 52, and 54–57, while the shell structure of solar collector apparatus 20 rotates about the axis formed by axles 30 and 44. Mirrors 50 and 52 on the left side of shell 20a form a first preferred reflector embodiment for solar collector 20a. In particular, mirrors 50 and 52 are configured as cylindrical surfaces having focal points on the adjacent the entrances of solar energy absorber apparatus 62 and 60 behind the face of the opposing mirror. For example, mirror 50 has a focal point at the entrance to solar energy apparatus 61 located behind aperture 53 in mirror 52. Mirror 52 has a similar focal point at the entrance to solar energy absorber apparatus 60 corresponding to aperture 51 in mirror 50.

Whereas mirrors 50 and 52 are configured as generally cylindrical, parabolic surfaces with the respective apertures therein, apertures 51 and 53, the requirement for apertures is obviated by providing by a different embodiment which features double cylindrical, parabolic mirrors on each side as set forth in the right hand side of solar collector 20a by the mirrors 54–57. For example, mirrors 54 and 55 occupy the left hand side of the respective portion of solar collector 20a and focus solar radiation on solar energy absorber apparatus 62. Correspondingly, mirrors 56 and 57 focus solar radiation between mirrors 54 and 55 on solar energy absorber apparatus 61. In this manner, apertures are not required particularly since mirrors 54 and 55 may be suitably overlapped as well as mirrors 56 and 57. It is understood that the split mirrors 54 and 55 could also have a partial hole to permit their closer placement. Such close placement would permit more solar flux to be reflected into holorum 61 and 62.

Inherently, the first set of mirrors 51 and 52 and the second set of mirrors 54–57 each have a focal characteristic referred to in the art as a coma in that the focal region from a cylindrical, parabolic mirror with light other than parallel to the symmetry axis of the parabolic cross section is not focused to a single focal point but rather tending toward a tear drop or parabolic-like focal region configuration. This particular coma effect is most pronounced in mirrors 50 and 52 but can be substantially reduced by splitting the mirror surfaces as in mirrors 54–57. Accordingly, while mirrors 54–57 still have the coma characteristic, the total coma for each of mirrors 54 and 57 is approximately one half that of mirrors 51 and 52. Accordingly, superimposition of the coma from each of mirrors 54 and 55 as well as mirrors 56 and 57 results in a total coma area of a single mirror 54–57 while the solar radiation focused thereby approaches the equivalent of the total solar radiation focused by mirrors 51 and 52.

Cylindrical parabolic mirrors 50, 52, and 54–57 are possible in solar collector 20a because transparent cover 26 is configured as a linear Fresnel lens with the lenslets therein running longitudinally. Accordingly, the focus of Fresnel lens 26 is a band of focused solar flux that strikes the mirrors at their midline. Thus, each of cylindrical parabolic mirrors 50, 52, and 54–57 reflects and focuses the solar flux toward the respective solar energy absorber apparatus as set forth hereinbefore.

It is clear that the cover may be transparent and cylindrical parabolic mirrors 50, 52 or mirrors 54–57 could be replaced by paraboloid mirrors (not shown) without changing the other features of FIG. 3 such as apertures 51, 53, holorum 61, etc.

A bridge 64 extends between hollow axle 30 and axle 44 to serve as a support for solar energy absorber apparatus 60–62 and tubing 41 and 43. Bridge 64 remains stationary relative to frame 16 (FIG. 2) while the remainder of solar collector 20a rotates about the longitudinal axis represented by hollow axle 30 and axle 44. Thus tubing 41 and 43 are nonrotatably supported thereby eliminating expensive and troublesome swivel couplings therein.

Figure 4:
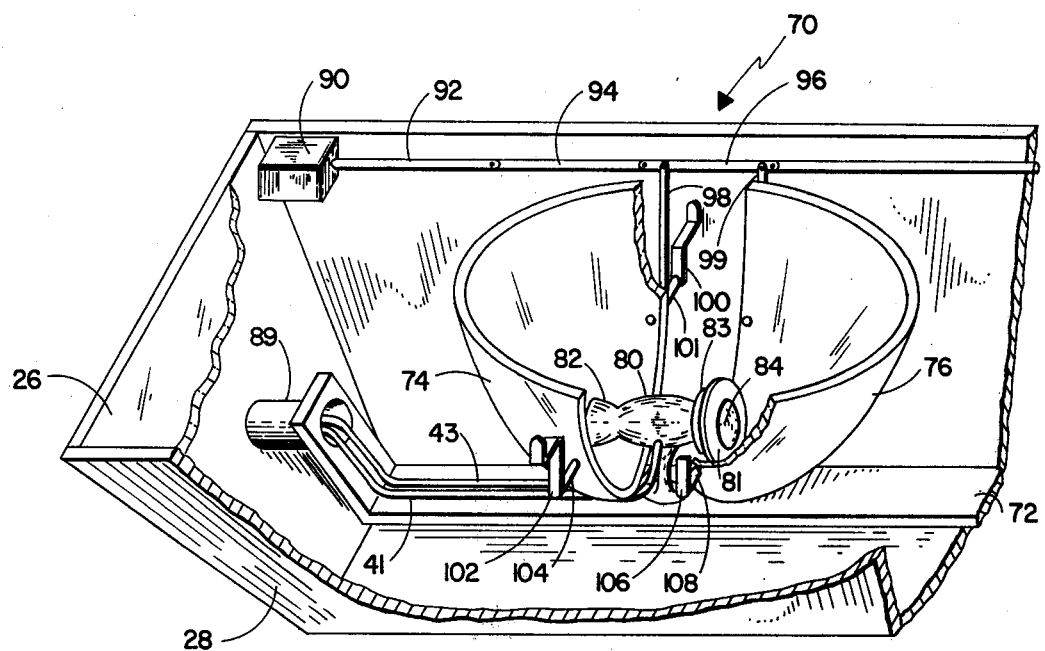
FIG. 4 is a perspective view of a second preferred embodiment of the solar collector apparatus of this invention with portions broken away to reveal internal components.

Referring now more particularly to FIG. 4, a second preferred focusing solar collector apparatus of this invention is shown schematically at 70 and includes parabola of revolution (parabaloid) mirror surfaces 74 and 76 suspended in shell 28. A solar energy absorber apparatus 80 is mounted on a bridge 72 and supported coaxially with axle 89 while remaining stationary thereby accommodating rotational movement of the balance of the structure of solar collector apparatus 70 so that the focal point for the solar energy remains essentially in the same position relative to solar energy absorber apparatus 80. Each of mirror surfaces 74 and 76 are configurated as one half or less than one half of a paraboloid surface. The focal point for each of mirrors 74 and 76 are at the respective entrance apertures of solar energy absorber apparatus 80, the apertures thereof being hidden and surrounded by optional Winston collectors 82 and 84, respectively. The parabaloid contour of mirrors 74 and 76 permit cover 26 (FIG. 4) to be a plain, transparent cover thereby eliminating any requirement for a linear Fresnel lens as shown in FIG. 3. Note that in principle mirrors 74 and 76 could be cylindrical and cover 26 could be a Linear Fresnel Lens as in FIG. 3 thus eliminating the apertures in the respective mirrors but not the coma.

Winston collectors 82 and 84 are configurated as paraboloid surfaces to reflect diffuse radiation into solar energy absorber apparatus 80 to increase the overall efficiency. It should be noted that solar energy absorbing apparatus 80 is supported on a line representing the axis of rotation of shell 28 about axle 89. Correspondingly, mirrors 74 and 76 are suspended in shell 28 at a position to accommodate rotation about their respective focal points to facilitate focusing solar energy toward absorber apparatus 80.

Mirror 74 is pivotally mounted to shell 28 by means of pivots 101 and 104 mounted in brackets 100 and 102, respectively. Each of brackets 100 and 102 are fixed to the interior wall of shell 28. The axis represented by pivots 10 and 104 passes through the focal point of mirror 74 thereby accommodating the mirrors 74 to be rotated about such axis while maintaining the focal point at essentially the same position. Brackets 100 and 102 are configurated with a generally inverted L configuration and being rotated upwardly beyond the axis of rotation represented by pivots 101 and 104. This particular feature permits solar collector apparatus 20a to more efficiently track the sun during its apparent daily traversal of the sky. Use of such brackets permits tracking of the sun through more than 180 degrees (as occurs in the summer in northern latitudes) about the axis given by arrow 24 (FIG. 2). Similar mounting features are also provided mirror 76 by means of pivot 108 suspended by bracket 106.

Rotation of mirrors 74 and 76 is provided by a parallelogram-type linkage represented by cranks 98 and 99 pivotally suspended from push rod 96. Push rod 96 is connected to a piston 90 by linkage 94, piston 92 being reciprocally operated by controller 90. In operation, an extension of piston 92 by controller 90 causes cranks 98 and 99 to rotate to the right causing the upper rim of mirror 74 to rise and the upper rim of mirror 76 to lower thereby adjusting the solar collector 70 for seasonal variations of the position of the sun above the earth. Correspondingly, retraction of piston 92 by controller 90 results in a leftward movement of cranks 98 and 99 dropping the upper rim of mirror 74 and raising the upper rim of mirror 76. This operation adapts solar collector 70 for the relatively extreme sun positions during the winter and summer equinoxes.

A bridge 72 extends from hollow axle 89 and serves as a support member for solar energy absorber apparatus 80 and conduits 41 and 43. Bridge 72 remains stationary relative to frame 16 (FIG. 2) while the remainder of solar collector 70 rotates about the longitudinal axis represented by hollow axle 89. Thus conduits 41 and 43 are nonrotatably supported thereby eliminating expensive and troublesome swivel couplings therein.

Solar energy absorber apparatus 80 is configured as a conventional holorum and includes optional Winston collectors 82 and 84 for directing a portion of the scattered solar flux into solar energy absorber apparatus 80. In addition, an optional flat plate collector 83 for utilization of scattered solar flux is formed as a flat, annular surface around the end of Winston collector 84 and includes a coil of conduit 41 to thereby serve as a preheater to solar energy absorber apparatus 80. Flat plate collector 83 may also include a transparent cover plate and selective absorption coatings as is known in the art. Flat plate collector 83 may also be configured as a photovoltaic apparatus for converting a portion of the solar flux to electrical energy with the subject coil providing any necessary cooling.

It should be understood further that holorums 60, 61, and 62 in FIG. 3 and holorum 80 in FIG. 4 may be replaced by fluid cooled photovoltaic cells. Selective mirrors and two or more different types of photovoltaic cells may replace these holorums to provide an optimum efficiency system for production of electric power from concentrated sunlight. Concentration of solar flux reduces the area of solar cells required for electric power production and thus minimizes the cost of their expensive item. It is known in the art that the use of two or more different types of photo cells (for example galium arsenide and silicon) matched to their optimum spectral ranges, gives an overall system performance about double the efficiency of either cell system used exclusively. Fluid cooling further increases the efficiency of photovoltaic cells. The heated fluid may be used for space heating or air conditioning.

It should be clearly understood throughout the description of this invention that suitable insulation at any appropriate location such as around the various conduits, solar energy absorber apparatus, etc., will provide improved efficiencies as is well known in the art. However, for sake of simplicity in understanding the novel features of this invention, all such insulation was purposely excluded from the drawing.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A solar collector comprising:
   a shell structure, the shell structure having an open top;
   first mounting means for the shell structure for rotating the shell structure about an axis to orient the open top of the shell structure toward the sun;
   solar energy absorber means inside the shell structure and mounted coaxially with the axis;
   second mounting means for supporting the solar energy absorber means inside the shell structure in a nonrotatable position relative to the sun to thereby accommodate rotational movement of the shell about the solar energy absorber means; and
   optical means in the shell structure for directing solar energy toward the solar energy absorber means and focusing the solar energy coaxially on the solar energy absorber means, said optical means comprising a linear Fresnel lens means configured as a transparent cover for the open top of the shell structure, the linear Fresnel lens means concentrating solar energy into a linear focus, said optical means further comprising parabolic mirror means for focusing said linear focus into said solar energy absorber means.

2. The solar collector defined in claim 1 wherein the first mounting means comprises a framework with the shell structure rotatably mounted to the framework.

3. The solar collector defined in claim 2 wherein the first mounting means further comprises a base for supporting the framework, the base being oriented in a generally north-south direction to accommodate orienting the axis of the shell structure perpendicular to the sun.

4. The solar collector defined in claim 1 wherein the solar energy absorber means comprises conduit means for conducting a fluid heat transfer medium to and from the solar energy absorber means, the conduit means passing through the second mounting means thereby avoiding rotation of the conduit means when the shell structure is rotated upon the first mounting means.

5. The solar collector defined in claim 1 wherein the second mounting means comprises a first hollow shaft on at least one end of the shell structure, the hollow shaft serving as a passageway for said conduit means in rotatable relation to the shell structure and nonrotatable relation to the sun.

6. The solar collector defined in claim 1 wherein said second mounting means comprises a first hollow shaft and a second shaft, the shell structure being rotatably mounted on the first hollow shaft and the second shaft, the second mounting means further comprising a bridge structure extending between the first hollow shaft and the second shaft, the bridge structure supporting the solar energy absorber means coaxially with the axis.

7. A solar collector apparatus comprising:
   a framework;
   a plurality of solar collectors;
   first mounting means for rotatably mounting the solar collectors in the framework, each solar collector comprising a shell structure being rotatable about an axis;
   solar energy absorber means in each of the solar collectors and mounted coaxially with the axis of the solar collector;
   second mounting means for mounting the solar energy absorber means in each of the solar collectors and nonrotatably relative to the framework, the second mounting means comprising at least one hollow axle for each solar collector;

conduit means for transporting a fluid heat transfer medium through the solar energy absorber means in each of the solar collectors, the conduit means passing through the hollow axle of the second mounting means and thereby being in nonrotatable relationship with said framework; and focusing means for focusing solar energy toward the solar energy absorber means in each of the solar collectors, said focusing means comprising parabaloid mirror means inside each shell structure, said parabaloid mirror means focusing solar energy coaxially toward said solar energy absorber means.

8. The solar collector defined in claim 7 wherein the optical means further comprises support means for moveably supporting the parabaloid mirror means inside said shell structure to accommodate movement of the parabaloid mirror means in tracking relationship to the sun.

9. The solar collector defined in claim 8 wherein the support structure comprises mechanical linkage for truning the parabaloid mirror means about an axis corresponding to the focal point of the mirror surfaces.

10. The solar collector apparatus defined in claim 7 wherein the first mounting means comprises a gear on each solar collector and a rotatably shaft with a plurality of worm gears on the shaft, each of the worm gears selectively engaging the gears on the solar collector so that rotation of the shaft imparts rotation to each of the solar collectors.

11. The solar collector apparatus defined in claim 7 wherein the second mounting means further comprises a bridge structure in each solar collector, the bridge structure being nonrotatably mounted to the framework and serving as a platform for the solar energy absorber means and the conduit means.

12. The solar collector apparatus defined in claim 7 wherein the parabaloid mirror means further comprises support means for supporting the parabaloid mirror means inside each shell structure at a position wherein the focal point for each of the parabaloid mirror means remains relatively constant, the support means further comprising pivotal mounting means for pivotally mounting the parabaloid mirror means about an axis adjacent or passing close to the focal point of each parabaloid mirror means.

13. A method for collecting solar energy comprising:

preparing a solar collector as an open top shell structure;

rotatably mounting the shell structure in a framework for rotation about an axis;

forming a mounting means for rotatably mounting the shell structure in the framework, the mounting means comprising a hollow axle;

supporting a solar energy absorber means in the shell structure in nonrotatable relation therewith and coaxially with the axis;

passing heat transfer conduits through the hollow axle to the solar energy absorber means, the hollow axle providing a nonrotatable passageway for the conduits;

placing optical means in the shell structure for directing solar energy coaxially toward the solar energy absorber means, said optical means comprising pivotally mounted parabaloid mirror means; and orienting the solar collector toward the sun and directing solar energy coaxially toward the solar energy absorber means with the optical means by pivotally moving said parabaloid mirror means.

* * * * *